United States Patent Office 3,732,327
Patented May 8, 1973

3,732,327
OXIDATIVE-DEHYDROGENATION CATALYSTS
Emory W. Pitzer, Bartlesville, Okla., assignor to Phillips Petroleum Company
No Drawing. Filed June 4, 1971, Ser. No. 150,235
Int. Cl. C07c 11/12
U.S. Cl. 260—680 E       11 Claims

ABSTRACT OF THE DISCLOSURE

The properties of a lithium-tin-phosphorous catalyst active for the oxidative dehydrogenation of hydrocarbons are improved by the deposition of oxides of aluminum and calcium on the catalyst.

---

This invention relates to oxidative dehydrogenation catalysts.

In one of its more specific aspects, this invention relates to improvements in oxidative dehydrogenation catalysts relating to selectivity and strength.

The oxidative dehydrogenation of olefinic hydrocarbons employing a catalyst containing tin oxide in association with phosphorous and an element from Group I-A or II-A of the Period Table is known. Principal among such catalysts are those containing from about 0.1 to about 16 weight percent phosphorous, about 15 to about 75 weight percent tin and about 0.1 to about 10 percent lithium, sufficient oxygen being present to satisfy the valence requirements of those elements. One such catalyst, in general, is that catalyst described in Belgium Pat. 718,220 to Phillips Petroleum Company in which lithium is deposited in the aforementioned amounts from a lithium compound such as lithium nitrate. One such dehydrogenation process employing the catalyst is that of the aforementioned patent.

The method of the present invention is directed to modifications of such lithium-tin-phosphorus catalysts to increase the physical strength of the catalyst and its selectivity when employed in such processes. According to this invention, there is provided a method of preparing an improved catalyst of the nature defined which comprises impregnating the catalysts with a compound of aluminum or of calcium convertible to the oxide and calcining the impregnated catalyst to convert the compound to the oxide. This invention also provides the resulting catalyst.

The lithinum-tin-phosphorous catalyst, hereinafter designated Li-Sn-P catalyst, can be treated by the method of this invention either prior to or after initial use and can be in any form when treated. In any instance, the Li-Sn-P catalyst is impregnated with a solution of an aluminum compound or a calcium compound which, preferably, is convertible to the oxide on calcination. Suitable aluminum compounds and calcium compounds include aluminum nitrate, aluminum acetate, calcium nitrate, calcium acetate, calcium formate, aluminum sulfate, and their mixtures.

Any suitable catalyst impregnation technique can be used which deposits on the Li-Sn-P catalyst, in the form of the oxide after calcination, an amount of aluminum oxide or calcium oxide, individually or as mixtures, within the range of from about 0.5 to about 5 weight percent of the total weight of the catalyst with an amount within the range of from about 1.5 to about 3 weight percent being preferred for unused catalyst and from about 0.5 to about 1.0 weight percent of the total weight of the catalyst for previously used catalyst.

After impregnation, the catalyst is dried and calcined in air at a temperature within the range of from about 1000 to about 1500° F. for a period of from about 0.1 to about 24 hours according to conventional calcination procedures.

The modified Li-Sn-P catalysts are then employable to dehydrogenate hydrocarbons under such conditions as are conventionally employed in conjunction with the use of Li-Sn-P catalysts and as generally set forth in the aforementioned patent.

The preparation of the modified Li-Sn-P catalyst of this invention and its improved properties are illustrated by the following examples.

EXAMPLE I

About 32 parts by weight of a Li-Sn-P catalyst in pelleted form, containing 1.75 weight percent lithium and 10 weight percent phosphorous, were immersed in about 30 parts by weight of an aqueous solution containing 0.7 part by weight of $Al(NO_3)_2 \cdot 9H_2O$ for a period of about 5 minutes during which time the pellets were saturated. The pellets were removed from the solution, dried and thereafter calcined at a temperature of about 1250° F. for 4 hours. The modified catalyst contained about 0.1 weight percent alumina.

EXAMPLE II

The above procedure was carried out by immersing about 32 parts by weight of pelleted catalyst in about 40 parts by weight of an aqueous solution comprised of about 5.8 parts by weight of $Ca(NO_3)_2 \cdot 4H_2O$ in about 35 parts by weight of water for about five minutes. The calcined catalyst contained about 2 weight percent calcium oxide.

EXAMPLE III

Catalyst prepared by the general method of Examples I and II were individually employed in oxidative dehydrogenation of butene-2. For comparative purposes a Li-Sn-P catalyst, not modified by the method of this invention, was individually and similarly employed. All runs were under substantially identical conditions. Comparative results were as follows:

| Catalyst | Modifier Oxide | Weight percent | Modified selectivity to butadiene basis gas phase products, percent |
|---|---|---|---|
| Li-Sn-P | | 0 | 95.0 |
| Li-Sn-P | $Al_2O_3$ | 0.1 | 94.7 |
| Li-Sn-P | $Al_2O_3$ | 0.7 | 97.2 |
| Li-Sn-P | $Al_2O_3$ | 2.0 | 98.1 |
| Li-Sn-P | $Al_2O_3$ | 5.0 | 98.2 |
| Li-Sn-P | CaO | 2.0 | 99 |

The above data demonstrate that Li-Sn-P catalysts, modified in accordance with the method of this invention, produce substantial improvements in the selectivity of the conversion to desired products.

By modified selectivity is meant selectivity based on $C_1$ to $C_4$ hydrocarbons and oxides of carbon in the product, exclusive of such materials as furan, acetaldehyde, acrolein and the like, which can be present in low concentrations. The values given are for samples taken from the reactor after continuous operation with the hydrocarbon, steam and air mixture for 3 hours.

EXAMPLE IV

Li-Sn-P catalysts, modified by the impregnation techniques previously described employing aluminum nitrate solutions, were prepared and compared with Li-Sn-P catalysts, unmodified by the method of this invention, in respect to pellet crushing strength after service of various durations in oxidative dehydrogenation, with the following results:

| Catalyst | Modifier | Crushing strength, pounds, after hours in service | | |
|---|---|---|---|---|
| | | New | 6 hrs. | 72 hrs. |
| Li-Sn-P | None | 7.0 | 4.4 | 2.5 |
| Li-Sn-P | 2 wt. percent $Al_2O_3$ | 8.3 | 6.9 | 6.6 |
| Li-Sn-P | 5 wt. percent $Al_2O_3$ | 10.6 | 10.0 | |

EXAMPLE V

As mentioned previously, the method of the present invention is applicable to used catalyst, prior to or after its becoming inactive as shown by the following.

These data represent results realized with a Li-Sn-P catalyst before and after its modification with both aluminum oxide and calcium oxide. Impregnation techniques were as previously described.

| Catalyst | Modifier | | Modified selectivity to butadiene basis gas phase products, percent |
|---|---|---|---|
| | Oxide | Weight percent | |
| 1—New | 0 | 0 | 96 |
| 1—Used 2 weeks | 0 | 0 | 91 |
| 1—Used 2 weeks, modified | $Al_2O_3$ | 0.7 | 99 |
| Do | CaO | 0.7 | 96 |

The above data indicate that modification of the catalyst by the method of this invention after a decrease in catalytic activity is effective in restoring the selectivity of the catalyst.

While the above invention has been illustrated employing certain materials, the invention is not to be considered as being limited to the materials employed.

It will be evident from the foregoing that various modifications can be made to the method of this invention. Such are, however, considered to be within the scope of this invention.

What is claimed is:

1. A method of treating a catalyst comprising lithium, phosphorous and tin having catalytic activity for the dehydrogenation of hydrocarbons which comprises impregnating said catalyst with a compound of aluminum or calcium convertible to the oxide and calcining the impregnated catalyst to convert said compound to said oxide.

2. The method of claim 1 in which said catalyst is impregnated with a compound of aluminum in an amount sufficient to provide an aluminum oxide content within the range of from about 0.5 to about 5 weight percent of the total weight of said catalyst.

3. The method of claim 1 in which said catalyst is impregnated with a compound of calcium in an amount sufficient to provide a calcium oxide content within the range of from about 0.5 to about 5 weight percent of the total weight of said catalyst.

4. The method of claim 1 in which said catalyst is impregnated after use in dehydrogenation of hydrocarbons.

5. The method of claim 2 in which said catalyst is impregnated with aluminum nitrate and said catalyst after said calcining contains aluminum oxide in an amount within the range of 1.5 to 3 weight percent of said catalyst.

6. The method of claim 3 in which said catalyst is impregnated with calcium nitrate and said catalyst after said calcining contains calcium oxide in an amount within the range of 1.5 to 3 weight percent of said catalyst.

7. A catalyst prepared by the method of claim 1 and containing said oxide in an amount within the range of from about 0.5 to about 5 weight percent of said catalyst.

8. A catalyst prepared by the method of claim 1 and containing aluminum oxide deposited by impregnation and calcination in an amount within the range of from about 0.5 to about 5 weight percent of said catalyst.

9. A catalyst prepared by the method of claim 1 and containing calcium oxide deposited by impregnation and calcination in an amount within the range of from about 0.5 to about 5 weight percent of said catalyst.

10. A catalyst prepared by the method of claim 4.

11. A method for the oxidative dehydrogenation of olefinic hydrocarbons which comprises employing a catalyst prepared in accordance with the method of claim 1.

References Cited

UNITED STATES PATENTS

| | | | |
|---|---|---|---|
| 3,409,697 | 11/1968 | Callahan et al. | 260—680 E |
| 3,555,105 | 1/1971 | Nolan et al. | 260—280 E |
| 3,325,245 | 6/1967 | Rowton | 252—437 |
| 3,320,329 | 5/1967 | Nolan et al. | 252—437 |
| 3,513,215 | 5/1970 | Ogle | 260—680 E |

FOREIGN PATENTS

| | | | |
|---|---|---|---|
| 718,220 | 7/1967 | Belgium | 252—437 |

DELBERT E. GANTZ, Primary Examiner

J. V. HOWARD, Assistant Examiner

U.S. Cl. X.R.

252—437